Patented May 12, 1953

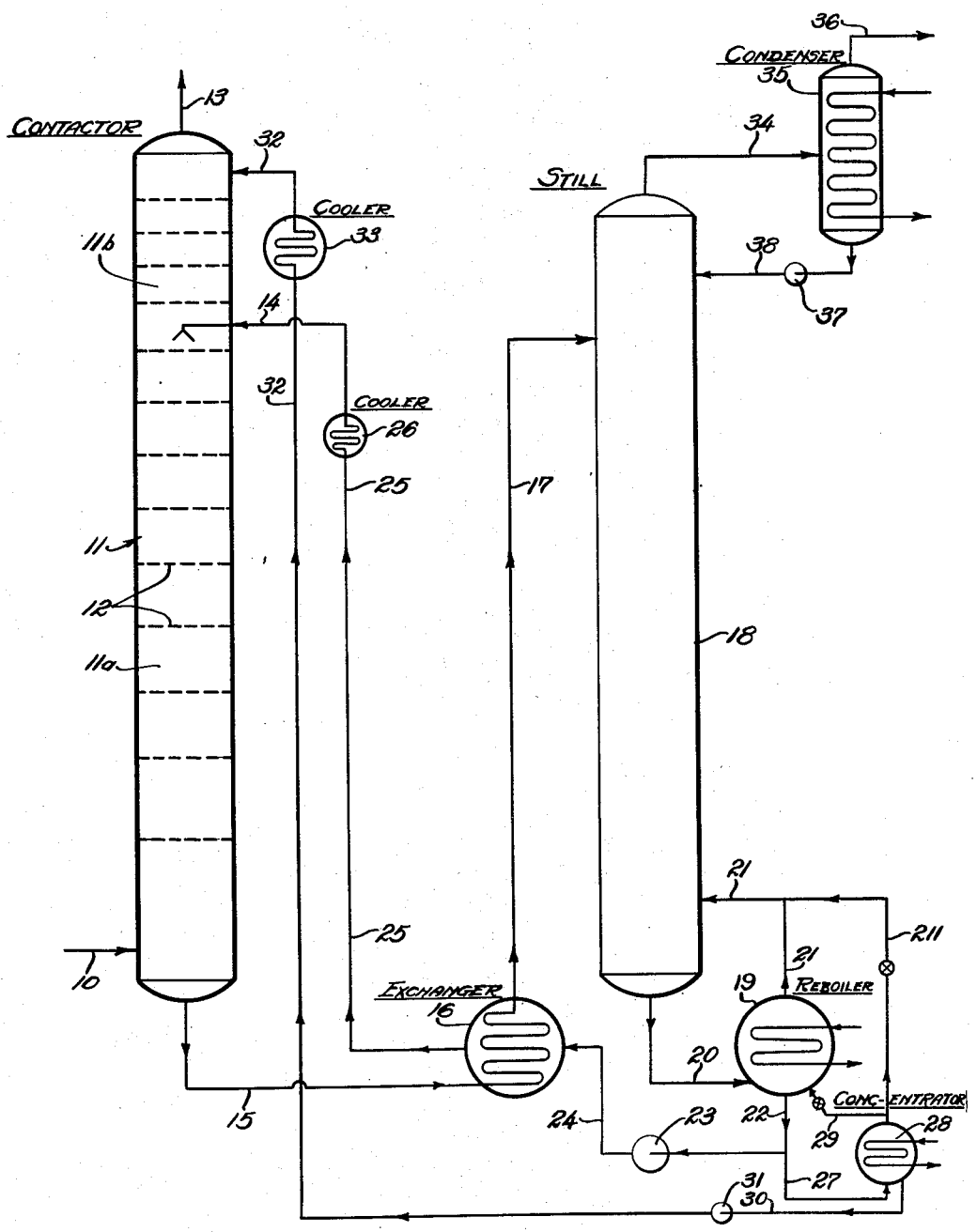

2,638,405

UNITED STATES PATENT OFFICE 2,638,405

AMINE TREATING AND DEHYDRATION OF GASES

Henry D. Frazier, Alhambra, Calif., assignor to The Fluor Corporation, Ltd., Los Angeles, Calif., a corporation of California Application October 31, 1947, Serial No. 783,323

10 Claims. (Cl. 23—2)

This invention has to do with the treatment of gaseous mixtures for the removal of acidic constituents and moisture, and is applicable generally to the treatment of hydrocarbon gases such as natural and refinery gases for their dehydration and removal of acidic impurities such as hydrogen sulfide and carbon dioxide. Particularly the invention is directed to an improved process whereby the same amine composition absorbent may be employed for both dehydration and acid gas absorption.

Heretofore aqueous amine solutions have extensively been used in gas treating for the removal of acidic impurities. Where required, dehydration of the gas has necessitated use of an additional absorbent, such for example as a solid or liquid desiccant through which the gas is passed following extraction of acidic impurities, or a hygroscopic glycol in the amine solution. Thus the amine solutions themselves have not been moisture absorptive, at least to any extent capable of dehydrating the gas to the degree required to prevent moisture precipitation and resultant hydrate formation in the ground pipes.

One of my major objects is to utilize an aqueous solution in a manner permitting efficient, and if desired selective, absorption of an acidic impurity, and to employ the same amine for dehydration of the gas, all by a simple cyclic contacting and regenerating process.

In general the invention contemplates contacting the gas in a first zone with an aqueous solution of the amine having such fluidity as to assure intimate and efficient gas-liquid contact, as well as high transfer rates in the heat exchange equipment, and then contacting the gas in a second zone with a solution of the same amine sufficiently concentrated to dehydrate the gas. As will appear, the invention is adaptable to single column stage treatment in which the dehydrating amine enters the first contacting zone to supplement and serve as the acid gas absorbent.

A further distinctive aspect of the invention is the method of regenerating the total amine absorbent, whereby a major portion is heated to liberate its absorbed acidic impurities and returned to the contactor in aqueous solution having the abovementioned characteristics, while a second portion of the amine is regenerated and dehydrated to the degree required for drying the gas in the second contactor stage.

The invention has various additional objects such as the use of an aqueous amine solution capable of selectively absorbing hydrogen sulfide as against carbon dioxide, and the particular materials, steps and operations involved in the gas treatment. All these will be explained to best advantage in the following detailed description in which reference is had to the accompanying drawing illustrative of a typical process in flow sheet form.

The amines, or mixture of amines employed, are characterized by various properties rendering them particularly adaptable for the several purposes of gas purification and dehydration, while maintaining high contact and heat transfer efficiency. Preferably I use a water soluble amine having a boiling temperature in excess of 200° C. and low viscosity in the water solutions employed. For dehydration purposes, the selected amine will in concentrated solution be hygroscopic to a degree such that it will absorb and reduce the moisture content of the gas to an extent such that no moisture will condense out of the gas at the usual ground temperatures to which the usual gas distribution pipes are subjected. As illustrative, I may use such high boiling temperature, normally liquid amines as methyldiethanolamine or triethylenetetramine, having the properties referred to above. Some of these amines may be used to further advantage where the prime consideration in purifying the gas is removal of its hydrogen sulfide content, in that such amines in aqueous solution are found to be preferentially absorptive of hydrogen sulfide as against carbon dioxide. Thus whereas all the hydrogen sulfide may be absorbed to produce a lead acetate sweet gas, the carbon dioxide is not correspondingly or equivalently absorbed and the bulk of the carbon dioxide content will remain unaffected.

Referring to the drawing, the gas containing moisture together with hydrogen sulfide and carbon dioxide as impurities, is fed through line 10 into the bottom of a contactor column 11 which may contain bubble trays 12 or other suitable means for effecting intimacy of contact between the liquid and gas. The treated and dehydrated gas leaves the contactor through line 13. Rising within a lower section 11a of the column, the gas is contacted with a down flowing stream of aqueous amine solution introduced to the contactor through line 14. Typically the absorbent will comprise an aqueous solution containing 20–40% amine by weight, and 30 to 80% water. Leaving the lower column section 11a, the gas flows through an upper section 11b in contact with a concentrated solution of the amine, i. e. a hygroscopic solution of the amine containing under about 10% water. While serving primarily to dehydrate the gas, the concentrated solution serves the additional function in the top section 11b of absorbing any uncombined hydrogen sulfide passing from the section 11a. Upon entering the lower section, the dehydrating solution supplements the amine absorbent introduced through line 14, to react with the hydrogen sulfide content of the gas.

Leaving the bottom of the contactor through line 15, the rich absorbent flows through one or more heat exchangers 16 and line 17 to the still 18 which may be of the usual type employed for amine solution regeneration in gas treating plants. After flowing downwardly through the still countercurrently to released gases and water vapor, the absorbent enters the reboiler 19 through line 20 and is heated to a temperature sufficient to drive off at least all but a small percentage of the absorbed impurities, and to concentrate the solution within the range previously ascribed to the absorbent introduced to the contactor through line 14. The gases and vapors released in the reboiler are returned to the still column through line 21. A major portion, say 80% to 90%, of the amine solution leaving the reboiler through line 22 is recirculated by pump 23 through line 24 and exchanger 16 for return to the contactor by way of line 25 and cooler 26.

The remaining portion of the solution is diverted from line 22 through line 27 to a concentrator 28 wherein the solution is dehydrated sufficiently to serve as the moisture absorbent in the top section 11b of the contactor. Water vapor and any residual liberated acid gas pass from the concentrator through line 29 into the reboiler for return to the still, or independently of the reboiler through line 211. From the concentrator, the dehydrated solution is taken through line 30 to be returned by pump 31 through line 32 and the cooler 33 to the contactor.

The still overhead passes through line 34 into condenser 35 from which the uncondensed gases are discharged through line 36. Water condensate is returned by pump 37 through line 38 to the still as reflux. It will be understood that the system may be operated under pressures commonly employed in amine treatment and regenerating plants.

I claim:

1. The method of treating a gaseous mixture for the removal of moisture and an acidic constituent, that includes contacting the gas in a first zone with a solution consisting essentially of a hygroscopic amine and water to remove said acidic constituent by its reaction with the amine, then contacting the gas in a second zone with a solution of said amine sufficiently concentrated to substantially dehydrate the gas by virtue of hygroscopicity of the amine, passing all the amine through a heating and regenerating zone to regenerate the amine solution and returning a portion of the regenerated solution to said first zone, and passing another portion of the regenerated solution through a heating and concentrating zone wherein the solution is concentrated by dehydration and returning the dehydrated solution to said second zone.

2. The method of treating a gaseous mixture for the removal of moisture and an acidic constituent, that includes contacting the gas in a first zone with a solution consisting essentially of a hygroscopic amine and water to remove said acidic constituent by its reaction with the amine, then contacting the gas in a second zone with a solution of said amine sufficiently concentrated to substantially dehydrate the gas by virtue of hygroscopicity of the amine, passing all the amine through a heating and regenerating zone to regenerate the amine solution and returning a relatively large portion of the regenerated solution to said first zone, and passing another and relatively small portion of the regenerated solution through a heating and concentrating zone wherein the solution is concentrated by dehydration and returning the dehydrated solution to said second zone.

3. The method of treating a gaseous mixture for the removal of moisture and an acidic constituent, that includes contacting the gas in a first zone with an aqueous solution of an amine to remove said acidic constituent by its reaction with the amine, said amine having a boiling temperature in excess of 200° C., then contacting the gas in a second zone with a solution of said amine sufficiently concentrated to substantially dehydrate the gas, passing all the amine through a heating and regenerating zone to regenerate the amine solution and returning a portion of the regenerated solution to said first zone, and passing another portion of the regenerated solution through a heating and concentrating zone wherein the solution is concentrated by dehydration and returning the dehydrated solution to said second zone.

4. The method of treating a gaseous mixture for the removal of moisture and an acidic constituent, that includes contacting the gas in a first zone with an aqueous solution of an amine to remove said acidic constituent by its reaction with the amine, said solution containing from 30 to 80 percent water, then contacting the gas in a second zone with a solution of said amine sufficiently concentrated to substantially dehydrate the gas, the last mentioned solution containing less than 10 percent water, passing all the amine through a heating and regenerating zone to regenerate the amine solution and returning a portion of the regenerated solution to said first zone, and passing another portion of the regenerated solution through a heating and concentrating zone wherein the solution is concentrated by dehydration and returning the dehydrated solution to said second zone.

5. The method of treating a gaseous mixture for the removal of moisture and an acidic constituent, that includes contacting the gas in a first zone with a solution consisting essentially of a hygroscopic amine and water to remove said acidic constituent by its reaction with the amine, then contacting the gas in a second zone with a solution of said amine sufficiently concentrated to substantially dehydrate the gas by virtue of hygroscopicity of the amine, passing the amine solution from said first zone into the second zone, passing all the amine from the second zone through a heating and regenerating zone to regenerate the amine solution and returning a portion of the regenerated solution to said first zone, and passing another portion of the regenerated solution through a heating and concentrating zone wherein the solution in concentrated by dehydration and returning the dehydrated solution to said second zone.

6. The method of treating a gaseous mixture for the removal of moisture and an acidic constituent, that includes contacting the gas in a first zone with a solution consisting essentially of a hygroscopic amine and water to remove said acidic constituent by its reaction with the amine.

then contacting the gas in a second zone with a solution of said amine sufficiently concentrated to substantially dehydrate the gas by virtue of hygroscopicity of the amine, passing all the amine through a heating and regenerating zone to regenerate the amine solution and returning a portion of the regenerated solution to said first zone, passing another portion of the regenerated solution through a heating and concentrating zone wherein the solution is concentrated by dehydration and returning the dehydrated solution to said second zone, and passing vapors released from said concentrating zone into said regenerating zone.

7. The method of treating a gaseous mixture for the removal of moisture and an acidic constituent, that includes passing the gas upwardly through successive lower and upper zones in a contactor column, contacting the gas in said lower zone with a down-flowing solution consisting essentially of a hygroscopic amine and water to remove said acidic constituent by reaction with the amine, then contacting the gas in said upper zone with a solution of said amine sufficiently concentrated to substantially dehydrate the gas, passing all the amine through a heating and regenerating zone to regenerate the amine solution and returning a portion of the regenerated solution to said lower zone, and passing another portion of the regenerated solution through a heating and concentrating zone wherein the solution is concentrated by dehydration and returning the dehydrated solution to said upper zone.

8. The method of treating a gaseous mixture for the removal of moisture and an acidic constituent, that includes passing the gas upwardly through successive lower and upper zones in a contactor column, contacting the gas in said lower zone with a down-flowing aqueous solution of an amine to remove said acidic constituent by reaction with the amine, said amine being hygroscopic and having a boiling temperature in excess of 200° C. then contacting the gas in said upper zone with a solution of said amine sufficiently concentrated to substantially dehydrate the gas, passing all the amine through a heating and regenerating zone to regenerate the amine solution and returning a portion of the regenerated solution to said lower zone, passing another portion of the regenerated solution through a heating and concentrating zone wherein the solution is concentrated by dehydration and returning the dehydrated solution to said upper zone, and passing the amine solution from said upper zone downwardly through the lower zone.

9. The method of treating a gaseous mixture for the removal of moisture and an acidic constituent, that includes contacting the gas in a first zone with an aqueous solution of an amine to remove said acidic constituent by its reaction with the amine, said amine being hygroscopic and having a boiling temperature in excess of 200° C. then contacting the gas in a second zone with a solution of said amine sufficiently concentrated to substantially dehydrate the gas, removing the amine from said zones and heating and regenerating a first portion thereof and returning said portion to the first zone in aqueous solution, and heating and regenerating a second portion of the removed amine under temperature and pressure conditions such that said second portion contains substantially less moisture than said first portion, and returning said second portion to said second zone.

10. The method of treating a gaseous mixture for the removal of moisture and an acidic constituent, that includes contacting the gas in a first zone with a solution containing water and methyldiethanolamine to remove said acidic constituent by reaction with the amine, then contacting the gas in a second zone with a solution of said amine sufficiently concentrated to substantially dehydrate the gas, passing all the amine through a heating and regenerating zone to regenerate the amine solution and returning a portion of the regenerated solution to said first zone, and passing another portion of the regenerated solution through a heating and concentrating zone and returning the concentrated solution to said second zone.

HENRY D. FRAZIER.

References Cited in the file of this patent

UNITED STATES PATENTS

| Number | Name | Date |
|---|---|---|
| Re. 18,958 | Bottoms | Sept. 26, 1933 |
| 2,083,213 | Baehr et al. | June 8, 1937 |
| 2,106,446 | Baehr et al. | Jan. 25, 1938 |
| 2,161,663 | Baehr et al. | June 6, 1939 |
| 2,177,068 | Hutchinson | Oct. 24, 1939 |
| 2,311,342 | Kerns et al. | Feb. 16, 1943 |

OTHER REFERENCES

Bottoms, R. R., "Organic Bases for Gas Purification," I. and E. Chemistry, vol. 23, No. 5, May 1931, pp. 501–504.